(12) United States Patent
Haddad

(10) Patent No.: US 12,120,517 B2
(45) Date of Patent: Oct. 15, 2024

(54) SYSTEM FOR DETECTING SHORT DURATION ATTACKS ON CONNECTED VEHICLES

(71) Applicant: Telefonaktiebolaget LM Ericsson (publ), Stockholm (SE)

(72) Inventor: Wassim Haddad, San Jose, CA (US)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 146 days.

(21) Appl. No.: 17/423,795

(22) PCT Filed: Feb. 6, 2019

(86) PCT No.: PCT/IB2019/050969
§ 371 (c)(1),
(2) Date: Jul. 16, 2021

(87) PCT Pub. No.: WO2020/161523
PCT Pub. Date: Aug. 13, 2020

(65) Prior Publication Data
US 2022/0078620 A1    Mar. 10, 2022

(51) Int. Cl.
*H04W 12/122* (2021.01)
*G06N 3/02* (2006.01)
(Continued)

(52) U.S. Cl.
CPC ............ *H04W 12/122* (2021.01); *G06N 3/02* (2013.01); *G07C 5/008* (2013.01); *H04W 12/088* (2021.01); *H04W 12/106* (2021.01); *H04W 12/63* (2021.01)

(58) Field of Classification Search
CPC ............ H04W 12/122; H04W 12/088; H04W 12/106; H04W 12/63; H04W 4/40;
(Continued)

(56) References Cited

U.S. PATENT DOCUMENTS

2007/0067415 A1* 3/2007 Kawaguchi ........ G01C 21/3697
709/217
2015/0113638 A1* 4/2015 Valasek ................ G06F 21/562
726/22

(Continued)

OTHER PUBLICATIONS

Checkoway, et al., "Comprehensive Experimental Analyses of Automotive Attack Surfaces," Center for Automotive Embedded Systems Security (CAESS), USENIX Security, Aug. 10-12, 2011, downloaded from http://www.autosec.org/pubs/cars-usenixsec2011.pdf, pp. 1-16.

(Continued)

*Primary Examiner* — Piotr Poltorak
*Assistant Examiner* — Suman Debnath
(74) *Attorney, Agent, or Firm* — Weisberg I.P. Law, P.A.

(57) ABSTRACT

A network device implements a method to protect a vehicle from insertion of malicious operations. The method includes establishing a communication session with a requestor as a proxy for the vehicle, receiving status information from the vehicle, querying a deep learning platform with the status information and message from the requestor, and dropping the message from the requestor in response to the deep learning platform indicating the message is malicious.

17 Claims, 7 Drawing Sheets

(51) Int. Cl.
*G07C 5/00* (2006.01)
*H04W 12/088* (2021.01)
*H04W 12/106* (2021.01)
*H04W 12/63* (2021.01)

(58) Field of Classification Search
CPC ... H04L 63/1441; H04L 63/1416; G06N 3/02; G07C 5/008
See application file for complete search history.

(56) References Cited

U.S. PATENT DOCUMENTS

| | | | |
|---|---|---|---|
| 2018/0004964 A1 | 1/2018 | Litichever et al. | |
| 2019/0052674 A1* | 2/2019 | Wada | H04L 63/1475 |
| 2019/0176758 A1* | 6/2019 | Wilding | B60R 25/2018 |
| 2019/0312781 A1* | 10/2019 | Kafzan | H04L 63/20 |
| 2019/0354108 A1* | 11/2019 | Okajima | B60R 21/00 |
| 2020/0106624 A1* | 4/2020 | Russell | H04L 9/50 |

OTHER PUBLICATIONS

Luo, et al., "Wireless Telematics Systems in Emerging Intelligent and Connected Vehicles: Threats and Solutions," IEEE Wireless Communications, vol. 25, Issue: 6, Dec. 2018, 7 pages.
Miller, et al., "Adventures in Automotive Networks and Control Units," Aug. 6, 2013, downloaded from http://llmatics.com/car_hacking.pdf, pp. 1-101.

* cited by examiner

SYSTEM FOR DETECTING SHORT DURATION ATTACKS ON CONNECTED VEHICLES

CROSS-REFERENCE TO RELATED APPLICATIONS

This application is a national stage of International Application No. PCT/IB2019/050969, filed Feb. 6, 2019, which is hereby incorporated by reference.

TECHNICAL FIELD

Embodiments of the invention relate to the field of networked vehicles; and more specifically, to a method and system for protecting networked vehicles from attack via the connected network.

BACKGROUND ART

Modern vehicles include an increasing number of component devices with processing and communication capabilities. These component devices can be connected with one another within the vehicle over a local network and with external devices via mobile telecommunication systems. Many vehicles include a local bus referred to as a Controller Area Network (CAN bus). A CAN bus is a bus designed to allow a set of devices to communicate with each other without a host computer being attached to the CAN bus. The devices connected to a CAN bus can include electronic control units (ECUs).

ECUs are controllers for various subsystems in the vehicle. Often the biggest ECU is an engine control unit that manages the operation and/or monitoring of the engine. The ECU can be any type, size, or configuration of an embedded system. Other types of ECUs can be embedded for subsystems of the vehicles such as the transmission, power steering, braking, and similar subsystems. These ECUs can communicate between one another using the CAN bus. Some of the ECUs can have the capability of communicating with external networks including mobile telecommunication networks.

The CAN bus and the ECUs provide enhanced operation of the vehicle and its subsystems. However, these devices also present a vector of attack for individuals seeking to disrupt the operation of the vehicle by causing the ECUs to execute operations that are injected via the external networks and/or over the CAN bus. Due to the nature of the operation of vehicles even short disruptions to the operation of key subsystems can have dangerous repercussions for the operation of the vehicle and the safety of the occupants. The CAN bus and the ECUs do not have standardized security to protect them from the insertion and execution of improper instructions in spoofing or similar types of attacks.

SUMMARY

In one embodiment, a method is implemented by a network device to protect a vehicle from insertion of malicious operations. The method includes establishing a communication session with a requestor as a proxy for the vehicle, receiving status information from the vehicle, querying a deep learning platform with the status information and message from the requestor, and dropping the message from the requestor in response to the deep learning platform indicating the message is malicious.

In another embodiment, a non-transitory computer-readable medium has stored therein a set of instructions, which when executed by a computing device causes the computing device to perform a set of operations to implement the method to protect a vehicle from insertion of malicious operations. The set of operations includes establishing a communication session with a requestor as a proxy for the vehicle, receiving status information from the vehicle, querying a deep learning platform with the status information and message from the requestor, and dropping the message from the requestor in response to the deep learning platform indicating the message is malicious.

In a further embodiment, the network device executes the method to protect the vehicle from insertion of malicious operations. The network device includes a non-transitory computer-readable medium having stored therein a virtual vehicle entity, and a processor coupled to the non-transitory computer-readable medium. The processor executes the virtual vehicle entity. The virtual vehicle entity establishes a communication session with a requestor as a proxy for the vehicle, receives status information from the vehicle, queries a deep learning platform with the status information and message from the requestor, and drops the message from the requestor in response to the deep learning platform indicating the message is malicious.

BRIEF DESCRIPTION OF THE DRAWINGS

The invention may best be understood by referring to the following description and accompanying drawings that are used to illustrate embodiments of the invention. In the drawings.

DETAILED DESCRIPTION

Figure 1:
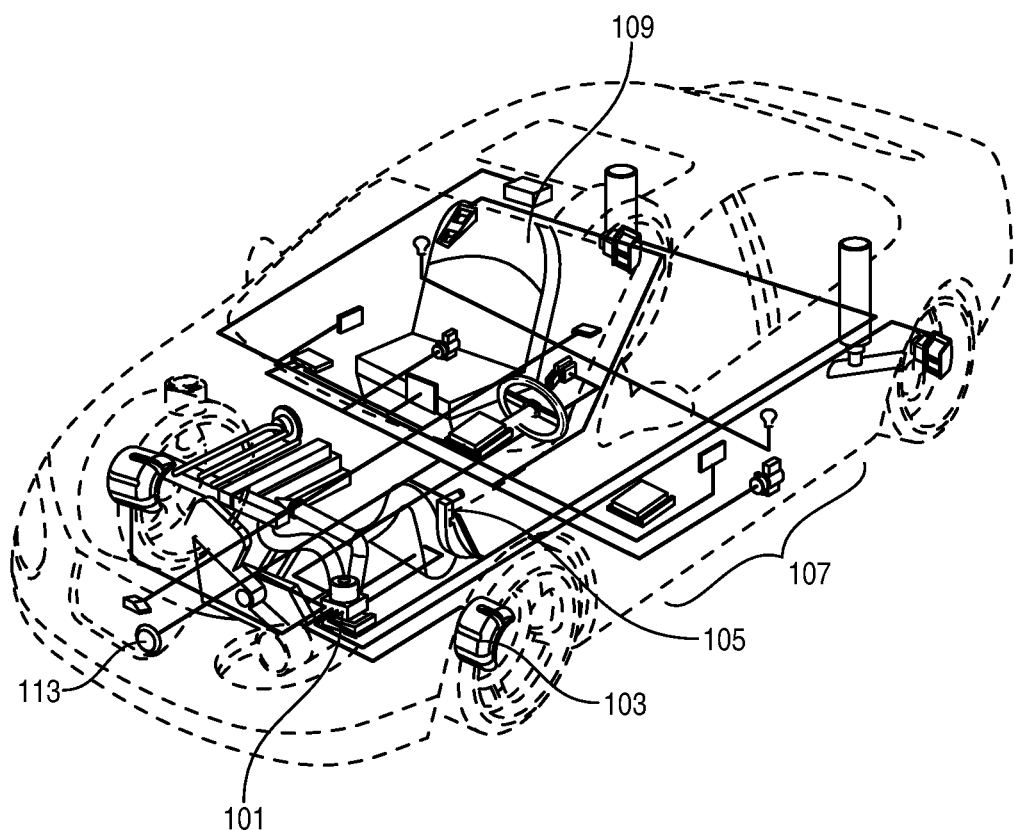
FIG. 1 is a diagram of one example of a vehicle with a controller area network. (CAN). A CAN is one type of in-vehicle network.

The following description describes methods and apparatus for defending a controller area network (CAN) from malicious attack. In particular, the embodiments provide a system for detecting and mitigating attacks by utilizing a virtual vehicle entity (VVE) that operates as a proxy for the CAN of the vehicle and evaluates operations destined for the vehicle before allowing the operations to be sent to the vehicle for execution. The VVE can utilize a set of distributed deep learning (DL) platforms (DDPs) that execute machine learning processes to assist in the evaluation of the operations. Based on the outcome of the evaluation of the VVE and DDLs the operations can be forwarded or discarded before they reach the vehicle and impact the operation of the vehicle.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors (e.g., wherein a processor is a microprocessor, controller, microcontroller, central processing unit, digital signal processor, application specific integrated circuit, field programmable gate array, other electronic circuitry, a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of receiving data from other electronic devices over a wireless connection and/or sending data out to other devices via a wireless connection. This radio circuitry may include transmitter(s), receiver(s), and/or transceiver(s) suitable for radiofrequency communication. The radio circuitry may convert digital data into a radio signal having the appropriate parameters (e.g., frequency, timing, channel, bandwidth, etc.). The radio signal may then be transmitted via antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate via wire through plugging in a cable to a physical port connected to a NIC. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

FIG. 1 is a diagram of one example of a vehicle with a controller area network. (CAN). A CAN is one type of in-vehicle network. The embodiments are described with relation to vehicles that implement a CAN and have a CAN bus, however, one skilled in the art would appreciate that the principles, structures, functions and processes described herein with relation to a vehicle with a CAN are provided by way of example and not limitation. The embodiments are applicable to other types of local area networks both wired and wireless within any type of vehicle.

In the example of a vehicle with a CAN, the CAN provides a network that allows devices within the vehicle to communicate through their respective Electronic Control Units (ECUs). Each of the components that is connected to the CAN has an ECU with a microcontroller, CAN controller, and CAN transceiver that enable communication over the CAN bus. Each message transmitted on the CAN bus is seen by all devices (i.e., ECUs) on the CAN bus. This allows each ECU to decide if the message is relevant for the component associated with the ECU or whether the message can be ignored or similarly discarded.

Examples of vehicle components with ECUs are illustrated in FIG. 1. These components can include the engine subsystem 101, transmission subsystem 105, braking system 103 (e.g., anti-lock braking system) ABS, lighting subsystem 113, door and trunk power subsystems 107 (e.g., power windows, automated door locks, and similar components), driver and passenger subsystems 109 (e.g., instrument panel devices, climate controls, entertainment systems) and similar vehicle components. Each of the ECUs for these components is connected to the CAN bus, which can be a wired bus. In other embodiments, the CAN bus or similar local area network can be any combination of wired and wireless. The components can communicate with one another via the CAN bus using any communication protocols and messaging formats compatible with the operation of the CAN bus.

The CAN bus is intended to be utilized by the attached components, authorized diagnostics devices, and the user of the vehicle. However, the potential exists for the CAN bus to be a vector for malicious activity including attempts at vehicle theft, terrorism, mischief, insurance fraud, espionage, feature (de)activation, identity theft, and similar malicious activities.

In addition any of the subsystem attached to the CAN bus can be capable of communication with external networks and devices using short and long range communication technologies. The components can have capabilities including Bluetooth, cellular or wireless telecommunications (e.g., 4G, 5G or WIFI), key fob communication, LIDAR, digital broadcasts (e.g., safety messages), throttle position sensors (TPS), tail light control signals, short range radio communications (e.g., dedicated short range communication (DSRC) radio), NFC, and similar technologies.

Figure 2:
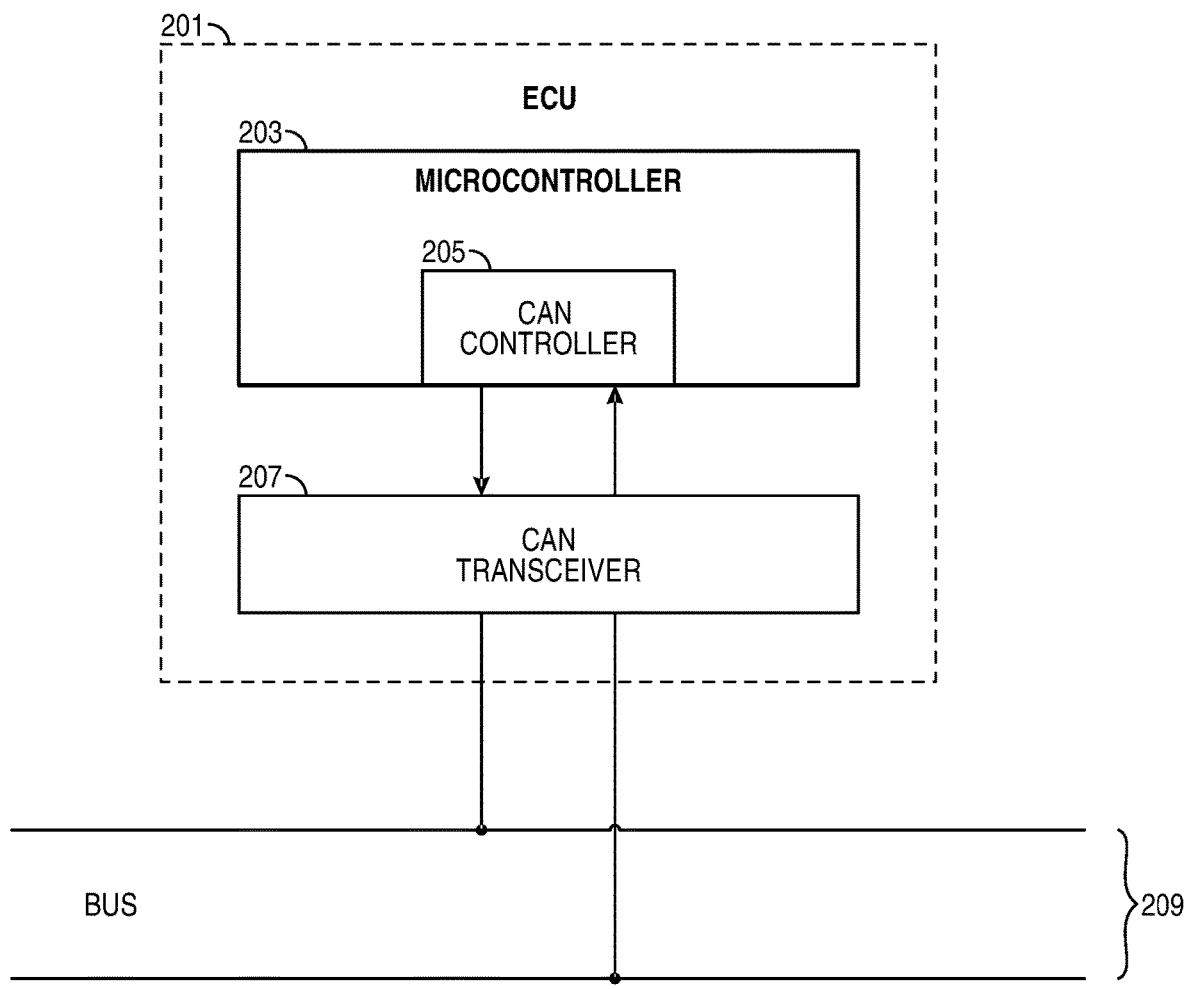
FIG. 2 is a diagram of an example simplified CAN bus with attached ECUs.

FIG. 2 is a diagram of an example simplified CAN bus with attached ECUs. As mentioned above each ECU 201 can include a set of microcontrollers 203, which each have a CAN controller 205, and a CAN transceiver 207. A 'set,' as used herein can be a whole number of items including one or more items. The ECU 201 is connected to the CAN bus 209. The ECU 201 can be an embedded system of any level of complexity and configuration. The ECU 201 can have the complexity of an onboard computing system with any number of processors and computing resources. In other cases, an ECU can be a limited microcontroller with minimal processing and computing resources.

The ECU 201 includes at least a microcontroller 203 and a CAN transceiver 207. The microcontroller 203 can be any type of processing device capable of executing instructions that enable the ECU 201 to interact with the CAN bus 209.

The ECU 201 can include multiple processors or microcontrollers to implement different functionality. The microcontroller 203 interfaces the software of the subsystem that the ECU 201 is a part of and enables the processing of messages received from the CAN bus 209 as well as the generation of messages to be sent to other components connected to the CAN bus 209.

The CAN controller 205 drives the CAN transceiver 207 to manage the sending and receiving of data over the CAN bus 209. The CAN controller 205 assembles received messages and provides data and commands to the CAN transceiver 207. The CAN controller 205 can manage the negotiation of the use of the CAN bus 209 with other ECUs. The CAN controller 205 can also determine whether messages received from the CAN bus 209 are intended for the ECU 201. The CAN transceiver 207 manages the signaling of data over the CAN bus 209 when sending data and the reading of data from the CAN bus 209.

The operation of the ECU 201 and its components are susceptible to remote attacks. It is possible for an attacker to get remote code execution on the ECU 201 via various interfaces with external devices and networks, e.g., Bluetooth interface, 4G, telematics unit, and similar interfaces. Using remote code execution an attacker can control the vehicle by injecting packets onto the CAN bus. These attacks require the exchanging of only a low number of messages. It is likely that inbound data traffic destined for a vehicle will be encrypted, which makes the detection of malicious messages hard to detect by intermediate processes.

Figure 3:
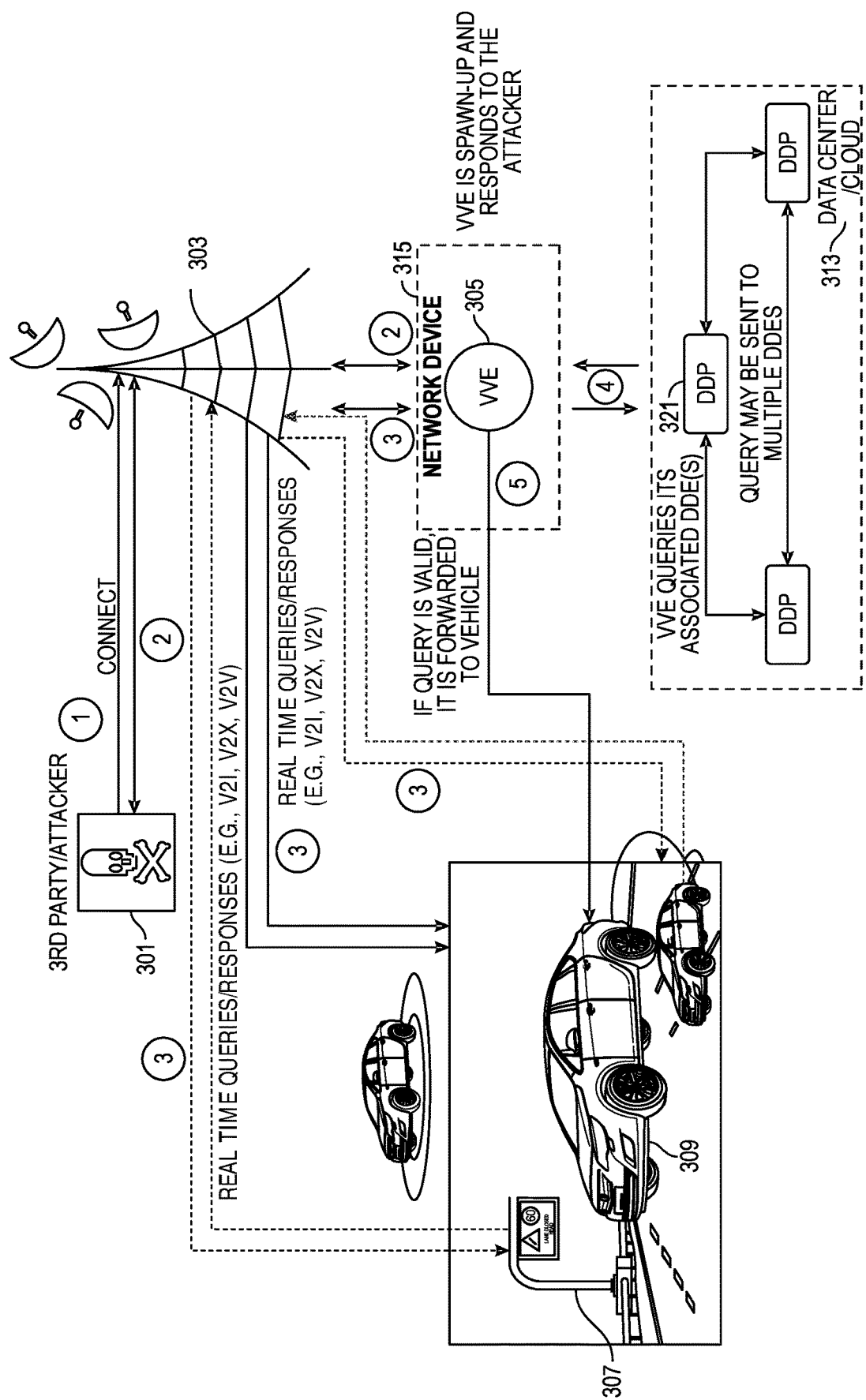
FIG. 3 is a diagram of one embodiment of a system for executing a virtual vehicle entity (VVE).

FIG. 3 is a diagram of one embodiment of a system for executing a VVE. The diagram presents a simplified operating environment for a VVE 305 for sake of clarity and conciseness in describing the operation of the VVE 305. One skilled in the art would understand that the VVE 305 can be implemented in contexts where there are any number of vehicles, where the VVE 305 communicates with any number of other data centers/cloud systems 313, where there are any number of radio access network (RAN) 303 connections, any number of attacking entities, and similar variations and combinations thereof. An example case where there is a single attacking entity and a single VVE servicing a single vehicle via a single RAN connection point and where the VVE 305 is executed a single network device 315 is provided by way of example and explanation and not by way of limitation.

Figure 4:
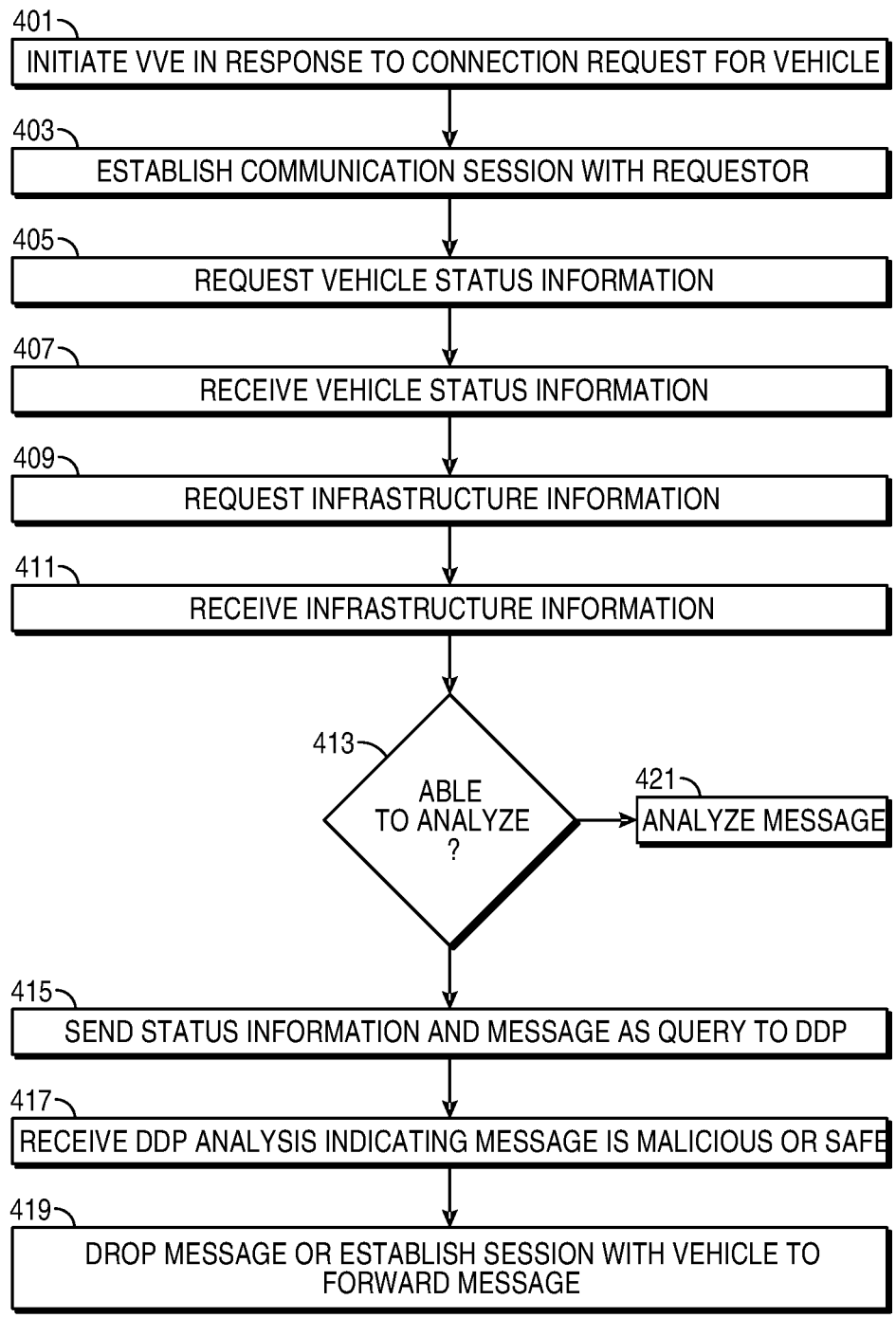
FIG. 4 is a diagram of one embodiment of a process implemented by the VVE 305.

FIG. 4 is a diagram of one embodiment of a process implemented by the VVE 305. The operation of the VVE 305 is described in relation and in combination with the overall operation of the system as shown in FIG. 3. In a case where an attacker 301 is attempting to insert malicious code or operations into a vehicle 309, the attacker 301 attempts to establish a communication connection with a component of the vehicle 309. The communication connection request can be made via any communication protocol or interface that the components of the vehicle. The VVE 305 to be involved in cases where the communication passes through a wireless telecommunication system to reach the vehicle. In the example, the vehicle 309 is connected with a radio access network 303 via 3G/4G/5G/WIFI or similar communication technology.

In response to receiving a connection request directed at a vehicle 309, the RAN 303 initiates a VVE 305 at a local network device 315 (Block 401). The VVE 305 can be executed at an edge network device 315 that is in proximity to the vehicle 309. The location of the VVE 305 can move if the vehicle is moving and connecting to different connection points in the RAN 303 such that the VVE 305 stays in proximity to the vehicle 315 by moving the execution of the VVE 305 to a network device 315 that is proximate to the vehicle 309.

The VVE 305 serves as a proxy and serves as an endpoint in a communication session that is established between the attacker 301 and the VVE 305. It would be understood that while the example is given of an attacker 301 attempting to communicate with the vehicle 309, the VVE 305 would serve as a proxy for any attempted communication from legitimate applications and processes. At the time of the connection request is would not be known by the RAN 303 whether the request originated from an attacker 301. The attacker 301 can be sending the communication request from any type of electronic device that is connected directly or indirectly with the RAN 303. For example, the attacker 301 can be a personal computer that is connected to the RAN 303 via a wide area network such as the Internet (not shown).

Once the VVE 305 is initiated, the VVE 305 can complete the establishment of the communication session between the attacker 301 making the request and the VVE 305 (Block 403). In some embodiments, a separate VVE 305 is initiated for each connection request. In other embodiments, a set of VVEs 305 can continuously service any number of connection requests where the VVEs 305 are executed at any number of network devices 315. The VVE 305 is configured to operate on behalf of the vehicle by providing and having access to the necessary credentials to establish a communication session with a third party as a proxy for the vehicle and its components. The VVE 305 can have access to any one or more of security certificates, vehicle identification numbers, and similar information. The VVE 305 can be initiated on demand, is secure, and self-contained. In some embodiments, the VVE 305 is implemented as or with a small virtual machine, a unikernel, or similar secure implementation that minimizes its attack surface.

After the communication session is established, the VVE 305 sends a request to the vehicle that is the intended destination of the messages of the attacker to request vehicle status information (Block 405). The request is for a current state or snapshot of the operation of any subset of the components of the vehicle 309. The vehicle 309 can have an ECU that is dedicated to interface with the ECU and handle the status information request or the VVE 309 can query any number or combination of the components of the vehicle 309 to build the status information. The status information that is returned can include driving conditions, location information, sensor information, component operating status, and similar information. In parallel or separately, the VVE 305 can query infrastructure 307 in proximity to the vehicle 309 to gather additional information about the operational status of the vehicle 309 (Block 409). Infrastructure 307 can be any roadside sensors, services that provide local traffic and/or weather information, road condition reports, nearby vehicle information and similar information that is made available by traffic management infrastructure 307 proximate to the vehicle 309. The queries to the vehicle 309 and the traffic management infrastructure 307 can utilize any communication protocol or interfaces including vehicle to vehicle (V2V) communications, vehicle to infrastructure (V2I) communications, vehicle to everything (V2X) communications, and similar communication protocols.

In response, the vehicle 309 and the traffic management infrastructure 307 respond with the requested information (Block 407 and 411). The vehicle status information can have any content, format, or size. The vehicle status information provides a snapshot of current operating conditions. The more information that is provided the better the assessment and monitoring of incoming messages can be carried out. Similarly, the conditions and information that is reported by the traffic management infrastructure 307 can have any content, format, or size. This information provides a snapshot of the current conditions in proximity to the vehicle 309. In some embodiments, the VVE 305 organizes this data to generate a query to a DDP or set of DDP 321 (Block 415). In other embodiments, the VVE 305 can have the capacity to analyze the message and data itself or locally based on machine-learning, rules, policies, comparison to past message and status information, or on a similar basis (Block 421). Where the VVE 305 has some local analysis capacity, then a decision can be made whether the received message and status information can be processed locally or require the assistance of a set of DDP 321 (Block 413).

Where the VVE 305 queries the set of DDP 321, a query that combines the received message from the attacker 301 and the status information of the vehicle and infrastructure is sent to the set of DDP 321 (Block 415). This query can utilize all available status information or any subset thereof. The VVE 305 can be assigned any one or more DDP 321 to service the queries of the VVE 305. In some embodiments, the assignments of DDP 321 to VVE 305 can be based on proximity between the vehicle and the server, data center, edge computing devices, or similar computing devices that implement the set of DDP 321. Other assignment factors can include vehicle identification number, time, traffic information and similar factors. Different available DDPs can have differing capabilities including specialized analysis for different types of message or status information that offer different accuracy and confidence levels. The VVE 305 can query multiple DDPs 321 to evaluate the message and status information with less latency using distributed computing.

The set of DDP 321 provide a response analysis or decision (Block 417). The analysis or decision can be limited to a binary indication to drop or forward. In other embodiments, the response from the set of DDP 321 can provide more detailed feedback or information including error information that may be utilized by the VVE 305 to recognize repeat attacks and allow the VVE 305 to process the message without having to query the set of DDP 321. If the VVE 305 decides to drop the message (Block 419), then the message can be discarded. In some embodiments, an error can be returned to the sender of the message. If the VVE 305 decides to forward the message, then a communication session with the vehicle can be initiated to transmit the message to the vehicle or a component of the vehicle. In some embodiments, where a message is approved a direct communication session can be allowed to the vehicle 309. In other embodiments, the VVE 305 continues to monitor each message or a subset of the message destined for the vehicle 309 from the requestor.

The operations in the flow diagrams are described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

Figures 5A, 5B:
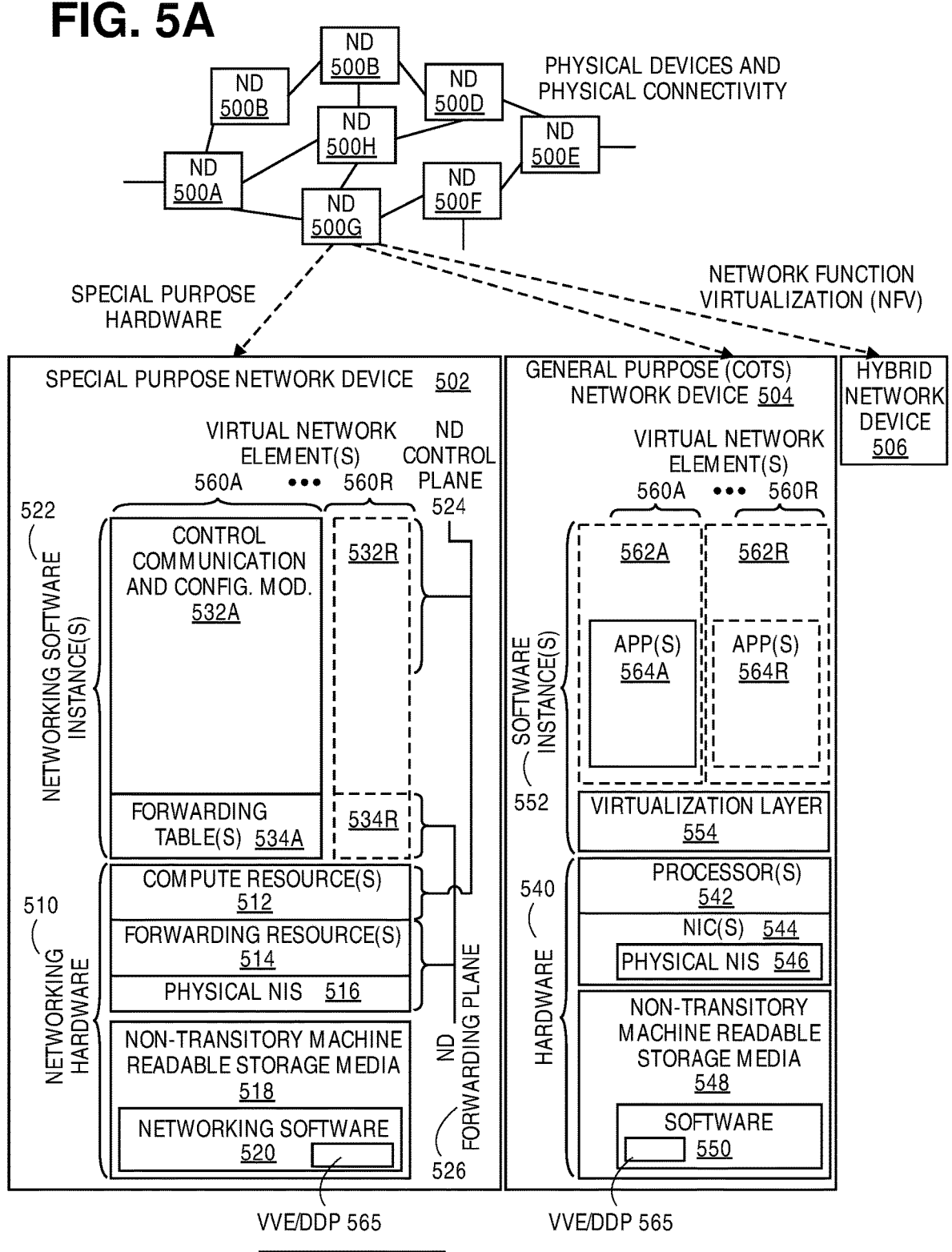
FIG. 5A illustrates connectivity between network devices (NDs) within an exemplary network, as well as three exemplary implementations of the NDs, according to some embodiments of the invention.
FIG. 5B illustrates an exemplary way to implement a special-purpose network device according to some embodiments of the invention.

FIG. 5A illustrates connectivity between network devices (NDs) within an exemplary network, as well as three exemplary implementations of the NDs, according to some embodiments of the invention. FIG. 5A shows NDs 500A-H, and their connectivity by way of lines between 500A-500B, 500B-500C, 500C-500D, 500D-500E, 500E-500F, 500F-500G, and 500A-500G, as well as between 500H and each of 500A, 500C, 500D, and 500G. These NDs are physical devices, and the connectivity between these NDs can be wireless or wired (often referred to as a link). An additional line extending from NDs 500A, 500E, and 500F illustrates that these NDs act as ingress and egress points for the network (and thus, these NDs are sometimes referred to as edge NDs; while the other NDs may be called core NDs).

Two of the exemplary ND implementations in FIG. 5A are: 1) a special-purpose network device 502 that uses custom application-specific integrated-circuits (ASICs) and a special-purpose operating system (OS); and 2) a general purpose network device 504 that uses common off-the-shelf (COTS) processors and a standard OS.

The special-purpose network device 502 includes networking hardware 510 comprising a set of one or more processor(s) 512, forwarding resource(s) 514 (which typically include one or more ASICs and/or network processors), and physical network interfaces (NIs) 516 (through which network connections are made, such as those shown by the connectivity between NDs 500A-H), as well as non-transitory machine readable storage media 518 having stored therein networking software 520. During operation, the networking software 520 may be executed by the networking hardware 510 to instantiate a set of one or more networking software instance(s) 522. Each of the networking software instance(s) 522, and that part of the networking hardware 510 that executes that network software instance (be it hardware dedicated to that networking software instance and/or time slices of hardware temporally shared by that networking software instance with others of the networking software instance(s) 522), form a separate virtual network element 530A-R. Each of the virtual network element(s) (VNEs) 530A-R includes a control communication and configuration module 532A-R (sometimes referred to as a local control module or control communication module) and forwarding table(s) 534A-R, such that a given virtual network element (e.g., 530A) includes the control communication and configuration module (e.g., 532A), a set of one or more forwarding table(s) (e.g., 534A), and that portion of the networking hardware 510 that executes the virtual network element (e.g., 530A).

The non-transitory machine-readable storage media 518 can also have stored therein either the VVE or the DDP 565 components that can be executed as networking software instances 522 or applications by the processors 512. In some embodiments, VVE and DDP are executed at the same network device 502 though not necessarily where the VVE and DDP are working together. In other embodiments, the VVE and DDP are executed at different computing devices, for example with the DDP implemented at a remote computing device (relative to the vehicle) and the VVE executed at a network device 502 that is proximate to the vehicle.

The special-purpose network device 502 is often physically and/or logically considered to include: 1) a ND control plane 524 (sometimes referred to as a control plane) comprising the processor(s) 512 that execute the control communication and configuration module(s) 532A-R; and 2) a ND forwarding plane 526 (sometimes referred to as a forwarding plane, a data plane, or a media plane) comprising the forwarding resource(s) 514 that utilize the forwarding table(s) 534A-R and the physical NIs 516. By way of example, where the ND is a router (or is implementing routing functionality), the ND control plane 524 (the processor(s) 512 executing the control communication and configuration module(s) 532A-R) is typically responsible for participating in controlling how data (e.g., packets) is to be routed (e.g., the next hop for the data and the outgoing physical NI for that data) and storing that routing information in the forwarding table(s) 534A-R, and the ND forwarding plane 526 is responsible for receiving that data on the physical NIs 516 and forwarding that data out the appropriate ones of the physical NIs 516 based on the forwarding table(s) 534A-R.

FIG. 5B illustrates an exemplary way to implement the special-purpose network device 502 according to some embodiments of the invention. FIG. 5B shows a special-purpose network device including cards 538 (typically hot pluggable). While in some embodiments the cards 538 are of two types (one or more that operate as the ND forwarding plane 526 (sometimes called line cards), and one or more that operate to implement the ND control plane 524 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/Transport Layer Security (TLS), Intrusion Detection System (IDS), peer-to-peer (P2P), Voice over IP (VOIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 536 (e.g., a first full mesh coupling the line cards and a second full mesh coupling all of the cards).

Returning to FIG. 5A, the general purpose network device 504 includes hardware 540 comprising a set of one or more processor(s) 542 (which are often COTS processors) and physical NIs 546, as well as non-transitory machine readable storage media 548 having stored therein software 550. During operation, the processor(s) 542 execute the software 550 to instantiate one or more sets of one or more applications 564A-R. While one embodiment does not implement virtualization, alternative embodiments may use different forms of virtualization. For example, in one such alternative embodiment the virtualization layer 554 represents the kernel of an operating system (or a shim executing on a base operating system) that allows for the creation of multiple instances 562A-R called software containers that may each be used to execute one (or more) of the sets of applications 564A-R; where the multiple software containers (also called virtualization engines, virtual private servers, or jails) are user spaces (typically a virtual memory space) that are separate from each other and separate from the kernel space in which the operating system is run; and where the set of applications running in a given user space, unless explicitly allowed, cannot access the memory of the other processes. In another such alternative embodiment the virtualization layer 554 represents a hypervisor (sometimes referred to as a virtual machine monitor (VMM)) or a hypervisor executing on top of a host operating system, and each of the sets of applications 564A-R is run on top of a guest operating system within an instance 562A-R called a virtual machine (which may in some cases be considered a tightly isolated form of software container) that is run on top of the hypervisor—the guest operating system and application may not know they are running on a virtual machine as opposed to running on a "bare metal" host electronic device, or through para-virtualization the operating system and/or application may be aware of the presence of virtualization for optimization purposes. In yet other alternative embodiments, one, some or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 540, directly on a hypervisor (in which case the unikernel is sometimes described as running within a LibOS virtual machine), or in a software container, embodiments can be implemented fully with unikernels running directly on a hypervisor represented by virtualization layer 554, unikernels running within software containers represented by instances 562A-R, or as a combination of unikernels and the above-described techniques (e.g., unikernels and virtual machines both run directly on a hypervisor, unikernels and sets of applications that are run in different software containers).

The non-transitory machine-readable storage media 548 can also have stored therein either the VVE or the DDP 565 components that can be executed as software instances 552 or applications by the processors 542. In some embodiments, VVE and DDP are executed at the same network device 504 though not necessarily where the VVE and DDP are working together. In other embodiments, the VVE and DDP are executed at different computing devices, for example with the DDP implemented at a remote computing device (relative to the vehicle) and the VVE executed at a network device 502 that is proximate to the vehicle.

The instantiation of the one or more sets of one or more applications 564A-R, as well as virtualization if implemented, are collectively referred to as software instance(s) 552. Each set of applications 564A-R, corresponding virtualization construct (e.g., instance 562A-R) if implemented, and that part of the hardware 540 that executes them (be it hardware dedicated to that execution and/or time slices of hardware temporally shared), forms a separate virtual network element(s) 560A-R.

The virtual network element(s) 560A-R perform similar functionality to the virtual network element(s) 530A-R—e.g., similar to the control communication and configuration module(s) 532A and forwarding table(s) 534A (this virtualization of the hardware 540 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). While embodiments of the invention are illustrated with each instance 562A-R corresponding to one VNE 560A-R, alternative embodiments may implement this correspondence at a finer level granularity (e.g., line card virtual machines virtualize line cards, control card virtual machine virtualize control cards, etc.); it should be understood that the techniques described herein with reference to a correspondence of instances 562A-R to VNEs also apply to embodiments where such a finer level of granularity and/or unikernels are used.

In certain embodiments, the virtualization layer 554 includes a virtual switch that provides similar forwarding services as a physical Ethernet switch. Specifically, this virtual switch forwards traffic between instances 562A-R and the physical NI(s) 546, as well as optionally between the instances 562A-R; in addition, this virtual switch may enforce network isolation between the VNEs 560A-R that by policy are not permitted to communicate with each other (e.g., by honoring virtual local area networks (VLANs)).

The third exemplary ND implementation in FIG. 5A is a hybrid network device 506, which includes both custom ASICs/special-purpose OS and COTS processors/standard OS in a single ND or a single card within an ND. In certain embodiments of such a hybrid network device, a platform VM (i.e., a VM that that implements the functionality of the special-purpose network device 502) could provide for para-virtualization to the networking hardware present in the hybrid network device 506.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 530A-R, VNEs 560A-R, and those in the hybrid network device 506) receives data on the physical NIs (e.g., 516, 546) and forwards that data out the appropriate ones of the physical NIs (e.g., 516, 546). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services code point (DSCP) values.

Figure 5C:
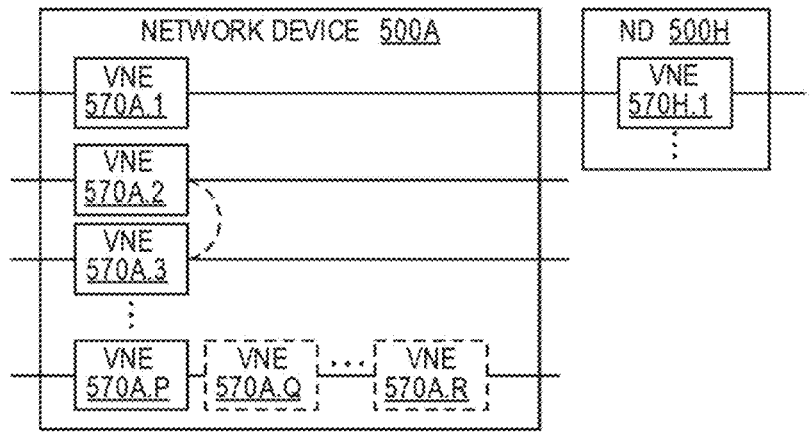
FIG. 5C illustrates various exemplary ways in which virtual network elements (VNEs) may be coupled according to some embodiments of the invention.

FIG. 5C illustrates various exemplary ways in which VNEs may be coupled according to some embodiments of the invention. FIG. 5C shows VNEs 570A.1-570A.P (and optionally VNEs 570A.Q-570A.R) implemented in ND 500A and VNE 570H.1 in ND 500H. In FIG. 5C, VNEs 570A.1-P are separate from each other in the sense that they can receive packets from outside ND 500A and forward packets outside of ND 500A; VNE 570A.1 is coupled with VNE 570H.1, and thus they communicate packets between their respective NDs; VNE 570A.2-570A.3 may optionally forward packets between themselves without forwarding them outside of the ND 500A; and VNE 570A.P may optionally be the first in a chain of VNEs that includes VNE 570A.Q followed by VNE 570A.R (this is sometimes referred to as dynamic service chaining, where each of the VNEs in the series of VNEs provides a different service—e.g., one or more layer 4-7 network services). While FIG. 5C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 5A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 5A may also host one or more such servers (e.g., in the case of the general purpose network device 504, one or more of the software instances 562A-R may operate as servers; the same would be true for the hybrid network device 506; in the case of the special-purpose network device 502, one or more such servers could also be run on a virtualization layer executed by the processor(s) 512); in which case the servers are said to be co-located with the VNEs of that ND.

A virtual network is a logical abstraction of a physical network (such as that in FIG. 5A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

Figure 5D:
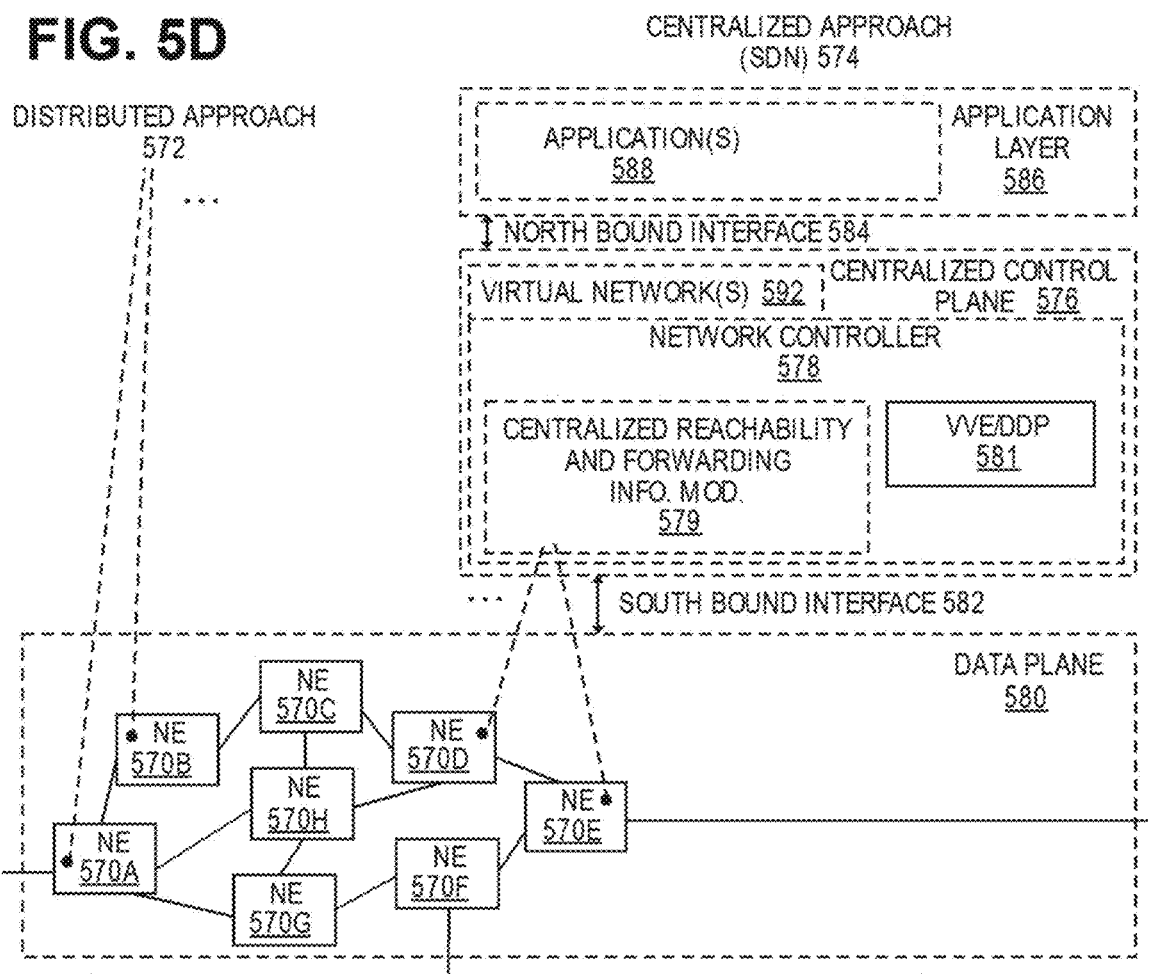
FIG. 5D illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments of the invention.

FIG. 5D illustrates a network with a single network element on each of the NDs of FIG. 5A, and within this straight forward approach contrasts a traditional distributed approach (commonly used by traditional routers) with a centralized approach for maintaining reachability and forwarding information (also called network control), according to some embodiments of the invention. Specifically, FIG. 5D illustrates network elements (NEs) 570A-H with the same connectivity as the NDs 500A-H of FIG. 5A.

FIG. 5D illustrates that the distributed approach 572 distributes responsibility for generating the reachability and forwarding information across the NEs 570A-H; in other words, the process of neighbor discovery and topology discovery is distributed.

For example, where the special-purpose network device 502 is used, the control communication and configuration module(s) 532A-R of the ND control plane 524 typically include a reachability and forwarding information module to implement one or more routing protocols (e.g., an exterior gateway protocol such as Border Gateway Protocol (BGP), Interior Gateway Protocol(s) (IGP) (e.g., Open Shortest Path First (OSPF), Intermediate System to Intermediate System (IS-IS), Routing Information Protocol (RIP), Label Distribution Protocol (LDP), Resource Reservation Protocol (RSVP) (including RSVP-Traffic Engineering (TE): Extensions to RSVP for LSP Tunnels and Generalized Multi-Protocol Label Switching (GMPLS) Signaling RSVP-TE)) that communicate with other NEs to exchange routes, and then selects those routes based on one or more routing metrics. Thus, the NEs 570A-H (e.g., the processor(s) 512 executing the control communication and configuration module(s) 532A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 524. The ND control plane 524 programs the ND forwarding plane 526 with information (e.g., adjacency and route information) based on the routing structure(s). For example, the ND control plane 524 programs the adjacency and route information into one or more forwarding table(s) 534A-R (e.g., Forwarding Information Base (FIB), Label Forwarding Information Base (LFIB), and one or more adjacency structures) on the ND forwarding plane 526. For layer 2 forwarding, the ND can store one or more bridging tables that are used to forward data based on the layer 2 information in that data. While the above example uses the special-purpose network device 502, the same distributed approach 572 can be implemented on the general purpose network device 504 and the hybrid network device 506.

FIG. 5D illustrates that a centralized approach 574 (also known as software defined networking (SDN)) that decouples the system that makes decisions about where traffic is sent from the underlying systems that forwards traffic to the selected destination. The illustrated centralized approach 574 has the responsibility for the generation of reachability and forwarding information in a centralized control plane 576 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 576 has a south bound interface 582 with a data plane 580 (sometime referred to the infrastructure layer, network forwarding plane, or forwarding plane (which should not be confused with a ND forwarding plane)) that includes the NEs 570A-H (sometimes referred to as switches, forwarding elements, data plane elements, or nodes). The centralized control plane 576 includes a network controller 578, which includes a centralized reachability and forwarding information module 579 that determines the reachability within the network and distributes the forwarding information to the NEs 570A-H of the data plane 580 over the south bound interface 582 (which may use the OpenFlow protocol). Thus, the network intelligence is centralized in the centralized control plane 576 executing on electronic devices that are typically separate from the NDs.

For example, where the special-purpose network device 502 is used in the data plane 580, each of the control communication and configuration module(s) 532A-R of the ND control plane 524 typically include a control agent that provides the VNE side of the south bound interface 582. In this case, the ND control plane 524 (the processor(s) 512 executing the control communication and configuration module(s) 532A-R) performs its responsibility for participating in controlling how data (e.g., packets) is to be routed (e.g., the next hop for the data and the outgoing physical NI for that data) through the control agent communicating with the centralized control plane 576 to receive the forwarding information (and in some cases, the reachability information) from the centralized reachability and forwarding information module 579 (it should be understood that in some embodiments of the invention, the control communication and configuration module(s) 532A-R, in addition to communicating with the centralized control plane 576, may also play some role in determining reachability and/or calculating forwarding information—albeit less so than in the case of a distributed approach; such embodiments are generally considered to fall under the centralized approach 574, but may also be considered a hybrid approach).

The network controller 578 can also execute either the VVE and/or the DDP 581 components. In other embodiments, the VVE and/or the DDP 581 can be executed as applications 588 by the application layer 586. In some embodiments, VVE and DDP 581 are executed at the same computing device though not necessarily where the VVE and DDP are working together. In other embodiments, the VVE and DDP are executed at different computing devices, for example with the DDP implemented at a remote computing device (relative to the vehicle) and the VVE executed at a network device that is proximate to the vehicle.

While the above example uses the special-purpose network device 502, the same centralized approach 574 can be implemented with the general purpose network device 504 (e.g., each of the VNE 560A-R performs its responsibility for controlling how data (e.g., packets) is to be routed (e.g., the next hop for the data and the outgoing physical NI for that data) by communicating with the centralized control plane 576 to receive the forwarding information (and in some cases, the reachability information) from the centralized reachability and forwarding information module 579; it should be understood that in some embodiments of the invention, the VNEs 560A-R, in addition to communicating with the centralized control plane 576, may also play some role in determining reachability and/or calculating forwarding information—albeit less so than in the case of a distributed approach) and the hybrid network device 506. In fact, the use of SDN techniques can enhance the NFV techniques typically used in the general purpose network device 504 or hybrid network device 506 implementations as NFV is able to support SDN by providing an infrastructure upon which the SDN software can be run, and NFV and SDN both aim to make use of commodity server hardware and physical switches.

FIG. 5D also shows that the centralized control plane 576 has a north bound interface 584 to an application layer 586, in which resides application(s) 588. The centralized control plane 576 has the ability to form virtual networks 592 (sometimes referred to as a logical forwarding plane, network services, or overlay networks (with the NEs 570A-H of the data plane 580 being the underlay network)) for the application(s) 588. Thus, the centralized control plane 576 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 5D shows the distributed approach 572 separate from the centralized approach 574, the effort of network control may be distributed differently or the two combined in certain embodiments of the invention. For example: 1) embodiments may generally use the centralized approach (SDN) 574, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 574, but may also be considered a hybrid approach.

While FIG. 5D illustrates the simple case where each of the NDs 500A-H implements a single NE 570A-H, it should be understood that the network control approaches described with reference to FIG. 5D also work for networks where one or more of the NDs 500A-H implement multiple VNEs (e.g., VNEs 530A-R, VNEs 560A-R, those in the hybrid network device 506). Alternatively or in addition, the network controller 578 may also emulate the implementation of multiple VNEs in a single ND. Specifically, instead of (or in addition to) implementing multiple VNEs in a single ND, the network controller 578 may present the implementation of a VNE/NE in a single ND as multiple VNEs in the virtual networks 592 (all in the same one of the virtual network(s) 592, each in different ones of the virtual network(s) 592, or some combination). For example, the network controller 578 may cause an ND to implement a single VNE (a NE) in the underlay network, and then logically divide up the resources of that NE within the centralized control plane 576 to present different VNEs in the virtual network(s) 592 (where these different VNEs in the overlay networks are sharing the resources of the single VNE/NE implementation on the ND in the underlay network).

Figure 5E:
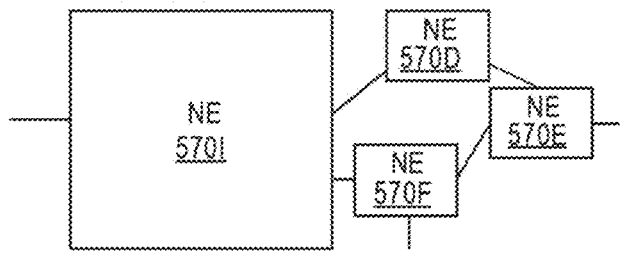
FIG. 5E illustrates the simple case of where each of the NDs implements a single NE, but a centralized control plane has abstracted multiple of the NEs in different NDs into (to represent) a single NE in one of the virtual network(s), according to some embodiments of the invention.
Figure 5F:
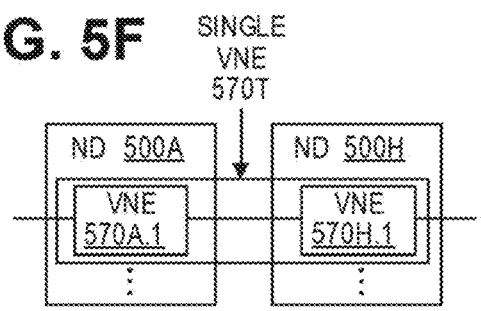
FIG. 5F illustrates a case where multiple VNEs are implemented on different NDs and are coupled to each other, and where a centralized control plane has abstracted these multiple VNEs such that they appear as a single VNE within one of the virtual networks, according to some embodiments of the invention.

On the other hand, FIGS. 5E and 5F respectively illustrate exemplary abstractions of NEs and VNEs that the network controller 578 may present as part of different ones of the virtual networks 592. FIG. 5E illustrates the simple case of where each of the NDs 500A-H implements a single NE 570A-H (see FIG. 5D), but the centralized control plane 576 has abstracted multiple of the NEs in different NDs (the NEs 570A-C and G-H) into (to represent) a single NE 570I in one of the virtual network(s) 592 of FIG. 5D, according to some embodiments of the invention. FIG. 5E shows that in this virtual network, the NE 570I is coupled to NE 570D and 570F, which are both still coupled to NE 570E.

FIG. 5F illustrates a case where multiple VNEs (VNE 570A. 1 and VNE 570H.1) are implemented on different NDs (ND 500A and ND 500H) and are coupled to each other, and where the centralized control plane 576 has abstracted these multiple VNEs such that they appear as a single VNE 570T within one of the virtual networks 592 of FIG. 5D, according to some embodiments of the invention. Thus, the abstraction of a NE or VNE can span multiple NDs.

While some embodiments of the invention implement the centralized control plane 576 as a single entity (e.g., a single instance of software running on a single electronic device), alternative embodiments may spread the functionality across multiple entities for redundancy and/or scalability purposes (e.g., multiple instances of software running on different electronic devices).

Figure 6:
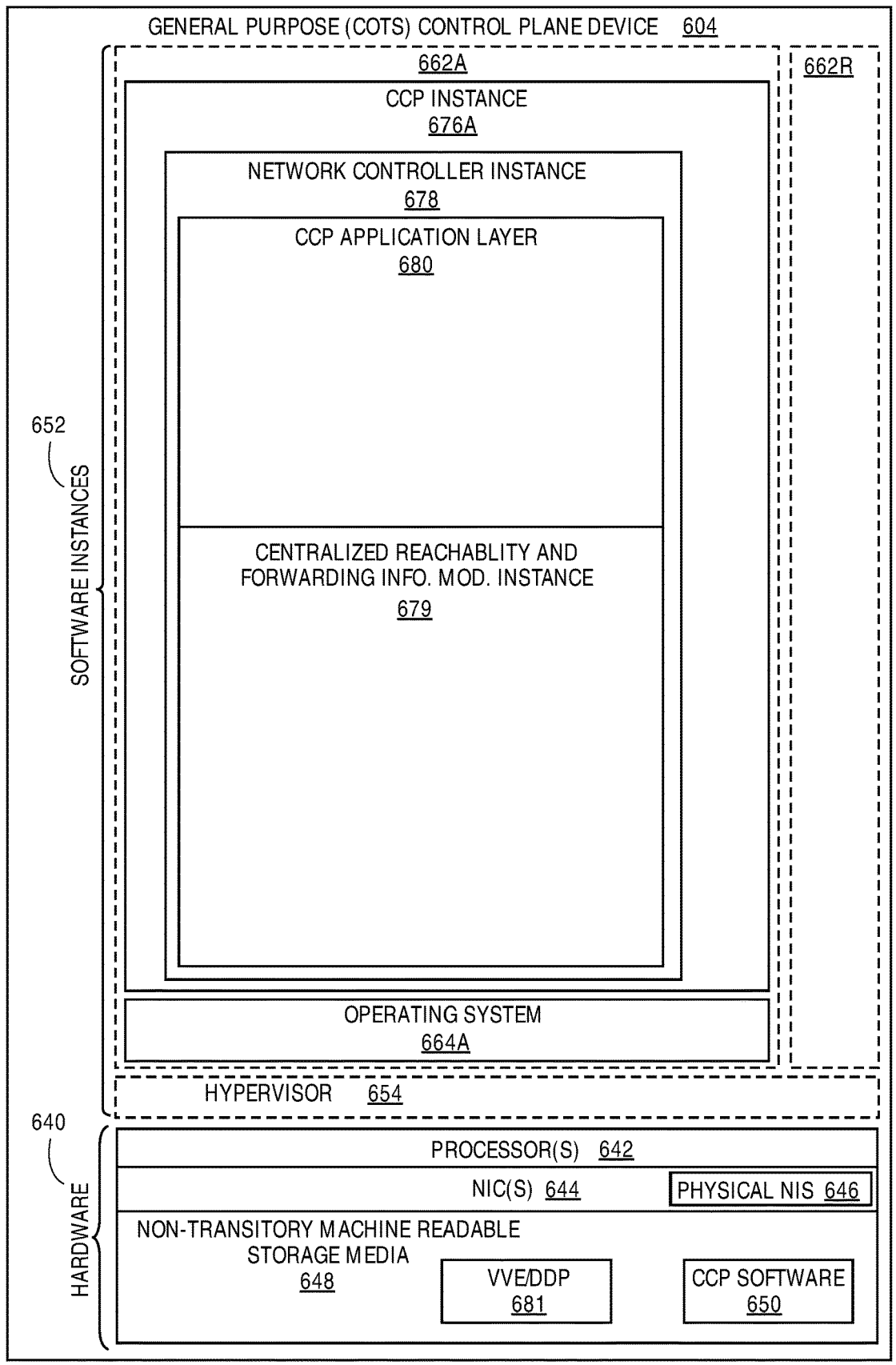
FIG. 6 illustrates a general purpose control plane device with centralized control plane (CCP) software 650), according to some embodiments of the invention.

Similar to the network device implementations, the electronic device(s) running the centralized control plane 576, and thus the network controller 578 including the centralized reachability and forwarding information module 579, may be implemented a variety of ways (e.g., a special purpose device, a general-purpose (e.g., COTS) device, or hybrid device). These electronic device(s) would similarly include processor(s), a set or one or more physical NIs, and a non-transitory machine-readable storage medium having stored thereon the centralized control plane software. For instance, FIG. 6 illustrates, a general purpose control plane device 604 including hardware 640 comprising a set of one or more processor(s) 642 (which are often COTS processors) and physical NIs 646, as well as non-transitory machine readable storage media 648 having stored therein centralized control plane (CCP) software 650.

The non-transitory computer-readable medium can also have stored therein the VVE/DDP 681 that is executed by the processors 642. In other embodiments, the VVE and/or the DDP 681 can be executed as applications by the application layer 680. In some embodiments, VVE and DDP 681 are executed at the same computing device though not necessarily where the VVE and DDP are working together. In other embodiments, the VVE and DDP are executed at different computing devices, for example with the DDP implemented at a remote computing device (relative to the vehicle) and the VVE executed at a network device that is proximate to the vehicle.

In embodiments that use compute virtualization, the processor(s) 642 typically execute software to instantiate a virtualization layer 654 (e.g., in one embodiment the virtualization layer 654 represents the kernel of an operating system (or a shim executing on a base operating system) that allows for the creation of multiple instances 662A-R called software containers (representing separate user spaces and also called virtualization engines, virtual private servers, or jails) that may each be used to execute a set of one or more applications; in another embodiment the virtualization layer 654 represents a hypervisor (sometimes referred to as a virtual machine monitor (VMM)) or a hypervisor executing on top of a host operating system, and an application is run on top of a guest operating system within an instance 662A-R called a virtual machine (which in some cases may be considered a tightly isolated form of software container) that is run by the hypervisor; in another embodiment, an application is implemented as a unikernel, which can be generated by compiling directly with an application only a limited set of libraries (e.g., from a library operating system (LibOS) including drivers/libraries of OS services) that provide the particular OS services needed by the application, and the unikernel can run directly on hardware 640, directly on a hypervisor represented by virtualization layer 654 (in which case the unikernel is sometimes described as running within a LibOS virtual machine), or in a software container represented by one of instances 662A-R). Again, in embodiments where compute virtualization is used, during operation an instance of the CCP software 650 (illustrated as CCP instance 676A) is executed (e.g., within the instance 662A) on the virtualization layer 654. In embodiments where compute virtualization is not used, the CCP instance 676A is executed, as a unikernel or on top of a host operating system, on the "bare metal" general purpose control plane device 604. The instantiation of the CCP instance 676A, as well as the virtualization layer 654 and instances 662A-R if implemented, are collectively referred to as software instance(s) 652.

In some embodiments, the CCP instance 676A includes a network controller instance 678. The network controller instance 678 includes a centralized reachability and forwarding information module instance 679 (which is a middleware layer providing the context of the network controller 578 to the operating system and communicating with the various NEs), and an CCP application layer 680 (sometimes referred to as an application layer) over the middleware layer (providing the intelligence required for various network operations such as protocols, network situational awareness, and user-interfaces). At a more abstract level, this CCP application layer 680 within the centralized control plane 576 works with virtual network view(s) (logical view(s) of the network) and the middleware layer provides the conversion from the virtual networks to the physical view.

The centralized control plane 576 transmits relevant messages to the data plane 580 based on CCP application layer 680 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 580 may receive different messages, and thus different forwarding information. The data plane 580 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 580, the packet (or a subset of the packet header and content) is typically forwarded to the centralized control plane 576. The centralized control plane 576 will then program forwarding table entries into the data plane 580 to accommodate packets belonging to the flow of the unknown packet. Once a specific forwarding table entry has been programmed into the data plane 580 by the centralized control plane 576, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method implemented by a network device in a communication network to protect a vehicle from insertion of malicious operations, the method comprising:
   establishing, by a virtual vehicle entity executed by the network device, a first communication session with a requestor, the virtual vehicle entity operating as a proxy for the vehicle, the virtual vehicle entity having a location that is in proximity to the vehicle, the location of the virtual vehicle entity moving based on the vehicle moving;
   querying traffic management infrastructure proximate to the vehicle for status information related to the vehicle, the traffic management infrastructure including at least one of:
   roadside sensors; and
   a service providing at least one of weather information, and road condition reports;
   receiving, by the virtual vehicle entity, a status information from the vehicle, the status information including at least one of:
   a current state; and
   a snapshot of an operation of any subset of components of the vehicle;
   querying, by the virtual vehicle entity, a deep learning platform with the status information received from the traffic management infrastructure and the vehicle and message from the requestor; and
   dropping, by the virtual vehicle entity, the message from the requestor in response to the deep learning platform indicating the message is malicious.

2. The method of claim 1, further comprising: querying the vehicle for the status information.

3. The method of claim 1, wherein the query to the deep learning platform includes the status information from the traffic management infrastructure.

4. The method of claim 1, further comprising:
   establishing a second communication session with the vehicle to forward the message to the vehicle, in response to the deep learning platform indicating the message is safe; and
   forwarding the message to the vehicle via the second communication session.

5. The method of claim 1, further comprising:
   initiating the virtual vehicle entity to operate as the proxy.

6. The method of claim 5, further comprising:
   determining the network device to execute the virtual vehicle entity in proximity to the vehicle.

7. A non-transitory computer-readable medium having stored therein a set of instructions, which when executed by a computing device causes the computing device to perform a set of operations to implement a method to protect a vehicle from insertion of malicious operations, the set of operations comprising:
   establishing, by a virtual vehicle entity executed by the computing device, a first communication session with a requestor, the virtual vehicle entity operating as a proxy for the vehicle, the virtual vehicle entity having a location that is in proximity to the vehicle, the location of the virtual vehicle entity moving based on the vehicle moving;
   querying traffic management infrastructure proximate to the vehicle for status information related to the vehicle, the traffic management infrastructure including at least one of:
   roadside sensors; and
   a service providing at least one of weather information, and road condition reports;

receiving, by the virtual vehicle entity, a status information from the vehicle via a radio access network, the status information including at least one of:
a current state; and
a snapshot of an operation of any subset of components of the vehicle;
querying, by the virtual vehicle entity, a deep learning platform with the status information received from the traffic management infrastructure and the vehicle and message from the requestor; and
dropping, by the virtual vehicle entity, the message from the requestor in response to the deep learning platform indicating the message is malicious.

8. The non-transitory computer-readable medium of claim 7, having further instructions stored therein, which when executed cause the computing device to perform further operations comprising:
querying the vehicle for the status information.

9. The non-transitory computer-readable medium of claim 7, wherein the query to the deep learning platform includes the status information from the traffic management infrastructure.

10. The non-transitory computer-readable medium of claim 7, having further
instructions stored therein, which when executed cause the computing device to perform further operations comprising:
establishing a second communication session with the vehicle to forward the message to the vehicle, in response to the deep learning platform indicating the message is safe; and
forwarding the message to the vehicle via the second communication session.

11. The non-transitory computer-readable medium of claim 7, having further instructions stored therein, which when executed cause the computing device to perform further operations comprising:
initiating the virtual vehicle entity to operate as the proxy.

12. The non-transitory computer-readable medium of claim 11, having further instructions stored therein, which when executed cause the computing device to perform further operations comprising: determining a network device to execute the virtual vehicle entity in proximity to the vehicle.

13. A network device to execute a method to protect a vehicle from insertion of malicious operations, the network device comprising:
a non-transitory computer-readable medium having stored therein a virtual vehicle entity; and
a processor coupled to the non-transitory computer-readable medium, the processor being configured to execute the virtual vehicle entity, the virtual vehicle entity being configured to:
establish a first communication session with a requestor, the virtual vehicle entity operating as a proxy for the vehicle, the virtual vehicle entity having a location that is in proximity to the vehicle, the location of the virtual vehicle entity moving based on the vehicle moving;
query traffic management infrastructure proximate to the vehicle for status information related to the vehicle, the traffic management infrastructure including at least one of:
roadside sensors; and
a service providing at least one of weather information, and road condition reports;
receive a status information from the vehicle via a radio access network, the status information including at least one of:
a current state; and
a snapshot of an operation of any subset of components of the vehicle;
query a deep learning platform with the status information received from the traffic management infrastructure and the vehicle and message from the requestor; and
drop the message from the requestor in response to the deep learning platform indicating the message is malicious.

14. The network device of claim 13, wherein the virtual vehicle entity is further to query the vehicle for the status information.

15. The network device of claim 13, wherein the query to the deep learning platform includes the status information from the traffic management infrastructure.

16. The network device of claim 13, wherein the virtual vehicle entity is further to establish a second communication session with the vehicle to forward the message to the vehicle, in response to the deep learning platform indicating the message is safe, and to forward the message to the vehicle via the second communication session.

17. The network device of claim 13, wherein the network device is selected to execute the virtual vehicle entity based on being in proximity to the vehicle.

* * * * *